United States Patent
Fukui

(10) Patent No.: US 6,884,387 B2
(45) Date of Patent: Apr. 26, 2005

(54) EMPTY-CAN TREATMENT SYSTEM AND EMPTY-CAN TREATMENT METHOD

(75) Inventor: Mitsugu Fukui, Toyota (JP)

(73) Assignees: Nissei Kogyo Co., Ltd. (JP); Kensuke Kawakube (JP)

( * ) Notice: Subject to any disclaimer, the term of this patent is extended or adjusted under 35 U.S.C. 154(b) by 226 days.

(21) Appl. No.: 10/310,727

(22) Filed: Dec. 4, 2002

(65) Prior Publication Data

US 2004/0080084 A1 Apr. 29, 2004

(30) Foreign Application Priority Data

Oct. 23, 2002 (JP) .................................. 2002-308919

(51) Int. Cl.[7] .............................................. C21D 1/08
(52) U.S. Cl. ..................... 266/261; 266/105; 266/121; 266/127; 266/249
(58) Field of Search ............................... 266/105, 121, 266/127, 249, 261

(56) References Cited

U.S. PATENT DOCUMENTS

| | | | |
|---|---|---|---|
| 3,490,500 A | * | 1/1970 | Kirchgaesser et al. ......... 140/1 |
| 4,168,993 A | * | 9/1979 | Wilson et al. ............... 148/598 |
| 4,654,088 A | * | 3/1987 | Fitzpatrick et al. ........... 134/18 |
| 5,769,331 A | * | 6/1998 | Yamagishi et al. ............ 241/5 |

FOREIGN PATENT DOCUMENTS

| | | | |
|---|---|---|---|
| JP | 9-192640 | * | 7/1997 |
| JP | 10-57931 | * | 3/1998 |
| JP | 11-309441 | | 11/1999 |
| JP | 2002-1292 | | 1/2002 |
| JP | 3284398 | | 3/2002 |
| JP | 2002-192122 | * | 7/2002 |

* cited by examiner

*Primary Examiner*—John P Sheehan
(74) *Attorney, Agent, or Firm*—Fish & Richardson P.C.

(57) ABSTRACT

In order to apply reclaimed oil to surfaces of empty cans each formed from a steel material and an aluminum material and having a coated surface and to heat the oil-applied empty cans, an empty-can treatment system includes a rotary kiln for heating the empty cans; a screw-type conveying apparatus for conveying the empty cans to the rotary kiln; and a reclaimed oil tank from which reclaimed oil is fed so as to be applied to the empty cans conveyed by means of the screw-type conveying apparatus. The screw-type conveying apparatus includes a casing pipe allowing the empty cans to pass therethrough; and a shaft portion disposed within the casing pipe and having a screw portion formed on the circumferential surface thereof. The shaft portion is formed of a pipe having oil discharge holes formed thereon at predetermined intervals.

11 Claims, 7 Drawing Sheets

EMPTY-CAN TREATMENT SYSTEM AND EMPTY-CAN TREATMENT METHOD

BACKGROUND OF THE INVENTION

1. Field of the Invention

The present invention relates to an empty-can treatment system and method for removing coating layers from surfaces of empty cans each formed from a steel material and an aluminum material and for separating the steel material and the aluminum material from each other for recycling.

2. Description of the Related Art

Conventionally, a can formed from a steel material and an aluminum material has been used to contain a soft drink or the like. Such a can is generally configured such that a bottom wall and a peripheral side wall are formed from a steel material and a lid wall is formed from an aluminum material. Also, coating is applied to the surface of the peripheral sidewall. Used empty cans are recycled to new material in waste disposal and treatment facilities. In this case, a steel material and an aluminum material are separated from each other so as to be recycled separately (as disclosed in, for example, Japanese Patent No. 3284398). In the disclosed recycling process, empty cans are heated by use of a heating means, and subsequently a granulator separates a steel material and an aluminum material.

When the above-mentioned empty cans are to be recycled, a coating layer formed on the surface of each empty can must be burned away at high temperature through application of heat. However, when the empty cans each formed from a steel material and an aluminum material (used to form a lid wall) are heated at high temperature, the aluminum material is excessively oxidized, leading to a decreased recovery rate for the aluminum material.

SUMMARY OF THE INVENTION

The present invention has been accomplished in view of the above-mentioned problem, and an object of the present invention is to provide an empty-can treatment system and method capable of removing a coating layer from the surface of each of empty cans and separating a steel material and an aluminum material with high recovery rate for the aluminum material.

To achieve the above object, the present invention provides an empty-can treatment system comprising a heating apparatus for heating empty cans each formed from a steel material and an aluminum material and having a coated surface, so as to carbonize a coating layer on the coated surface of each of the empty cans and to facilitate mutual separation of the steel material and the aluminum material through utilization of difference in thermal expansion coefficient between the materials; a conveying apparatus for conveying empty cans to the heating apparatus; and an oil feed apparatus for applying oil to surfaces of the empty cans being conveyed by means of the conveying apparatus.

According to the configuration of the present invention, in the course of conveyance of empty cans to the heating apparatus by means of the conveying apparatus, oil fed from the oil feed apparatus is applied to the surfaces of the empty cans. While the empty cans are heated in the heating apparatus, oil adhering to the surfaces of the empty cans burns, so that the heat of burning oil heats coating layers on the empty cans. Thus, even when the heating apparatus is set for heating at low temperature, the coating layers are sufficiently heated to be carbonized, thereby suppressing oxidation of the aluminum material, which would otherwise result from excessive heating, and enhancing the recovery rate for the aluminum material. When the heating apparatus is set to such a low heating temperature as to suppress oxidation of the aluminum material, the recovery rate for the steel material is further enhanced, since the steel material is less likely to be oxidized than is the aluminum material.

Preferably, the heating apparatus is a rotary kiln. In this case, empty cans are heated while rolling in the rotary kiln. Since the steel material and the aluminum material differ in thermal expansion rate, an engagement of the materials is loosened. Also, vibration stemming from rolling causes the steel material and the aluminum material to separate from each other or to be brought into an about-to-mutually-separate condition. Preferably, the rotary kiln is installed in such a manner as to be inclined downward with respect to the direction of conveyance of the empty cans, thereby allowing smooth conveyance of the empty cans.

Preferably, the heating apparatus uses a burner for heating the empty cans, and the burner is arranged such that a flame from the burner does not directly impinge on the empty cans. Such arrangement enables low-temperature heating.

Preferably, the heating apparatus is connected to an after-burning kiln adapted to completely burn exhaust gas generated in the heating apparatus, before release of the exhaust gas to the exterior of the system. Preferably, the heating apparatus is connected to a dust conveyor adapted to convey a carbonized substance and dust generated in the heating apparatus to the exterior of the system.

Preferably, the conveying apparatus comprises a tubular member allowing empty cans to pass therethrough; and a shaft member disposed within the tubular member and having a spiral screw portion formed on the circumferential surface thereof. Empty cans are conveyed to the heating apparatus by means of the screw portion in such a manner as to roll spirally in a space provided between the tubular member and the shaft member. Thus, oil fed from the oil feed apparatus can be efficiently applied to the surfaces of the empty cans, particularly to the surface of the peripheral side wall of each empty can.

Preferably, the conveying apparatus is installed in such a manner as to be inclined downward with respect to the direction of conveyance of empty cans, thereby allowing smooth conveyance of the empty cans.

Preferably, the shaft member is a pipe having oil discharge holes formed thereon at predetermined intervals; and the shaft member is connected to the oil feed apparatus such that oil fed from the oil feed apparatus is discharged into the interior of the tubular member through the oil discharge holes. Since the shaft member has the screw portion for conveying empty cans, and the oil discharge holes for discharging oil toward the empty cans therethrough, the distance between the oil discharge holes and the empty cans in process of conveyance is short, whereby oil can be applied more effectively to the surfaces of the empty cans.

Preferably, oil is fed under pressure to the oil discharge holes of the shaft member from the oil feed apparatus via a pipe line and a pump. Preferably, oil fed from the oil feed apparatus is reclaimed oil, and the oil feed apparatus comprises a reclaimed oil tank for storing the reclaimed oil.

The present invention further provides an empty-can treatment method comprising the steps of applying oil to the surfaces of empty cans each formed from a steel material and an aluminum material and having a coated surface; carbonizing a coating layer on the coated surface of each of the empty cans through application of heat to the empty cans; and separating the steel material and the aluminum material by means of stirring the empty cans in which the steel material and the aluminum material are in an about-to-mutually-separate condition established from different rates of thermal expansion of the materials effected by a heating in the coating-layer carbonization step.

According to the method of the present invention, empty cans to which oil is applied are heated to thereby carbonize a coating layer on the coated surface of each empty can. Further, the steel material and the aluminum material are brought into an about-to-mutually-separate condition established from different rates of thermal expansion of the materials effected by the heating. In the course of the heating, the empty cans are stirred, thereby effectively carbonizing coating layers and separating the steel material and the aluminum material from each other. Stirring the empty cans enables uniform heating of the surfaces of the empty cans, whereby the coating layers can be appropriately carbonized.

Even at low heating temperature, oil applied to the surfaces of the empty cans burns to thereby sufficiently heat and thus carbonize the coating layers, thereby suppressing oxidation of the aluminum material, which would otherwise result from excessive heating, and enhancing the recovery rate for the aluminum material. Preferably, oil used in the oil application step is a high-viscosity oil, since such a high-viscosity oil readily adheres to the surfaces of the empty cans. Once adhering to the surfaces of the empty cans, such a high-viscosity oil does not soon flow away from the surfaces, but can remain adhering to the surfaces. As a result, when the empty cans are heated, the heat of burning oil can sufficiently carbonize the coating layers on the empty cans. Preferably, oil to be applied to the surfaces of the empty cans is reclaimed oil, thereby reducing cost.

Preferably, the temperature of heating the empty cans in the coating-layer carbonization step is set such that the oil adhering to the surfaces of the empty cans can catch fire. More preferably, in the coating-layer carbonization step, the empty cans are heated at 350° C. to 450° C. so as to suppress oxidation of the aluminum material. The heating temperature is not set to such a high temperature as to burn the coating layers, but is set to such a low temperature as to be able to burn oil. As a result, the heat of burning oil heats the coating layers to thereby carbonize the coating layers; thus, the coating layers can be readily removed from the empty cans. Since the heating temperature is low, oxidation of the aluminum material is suppressed, thereby greatly enhancing the recovery rate for the aluminum material. In the course of the heating, the difference in thermal expansion coefficient between the aluminum material and the steel material brings the engaged materials into an about-to-mutually-disengage condition, whereby the aluminum material and the steel material can be effectively separated from each other in the subsequent step.

Preferably, a burner is used for heating the empty cans in the coating-layer carbonization step, and the burner is arranged such that a flame from the burner does not directly impinge on the empty cans. Such arrangement enables low-temperature heating.

Further preferably, heating is performed for a certain period of time or intermittently so as to avoid excessive heating of the empty cans. Such a practice also enables low-temperature heating. When temperature drops excessively after heating is halted, heating may be resumed.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which.

DESCRIPTION OF THE PREFERRED EMBODIMENT

Figure 1:
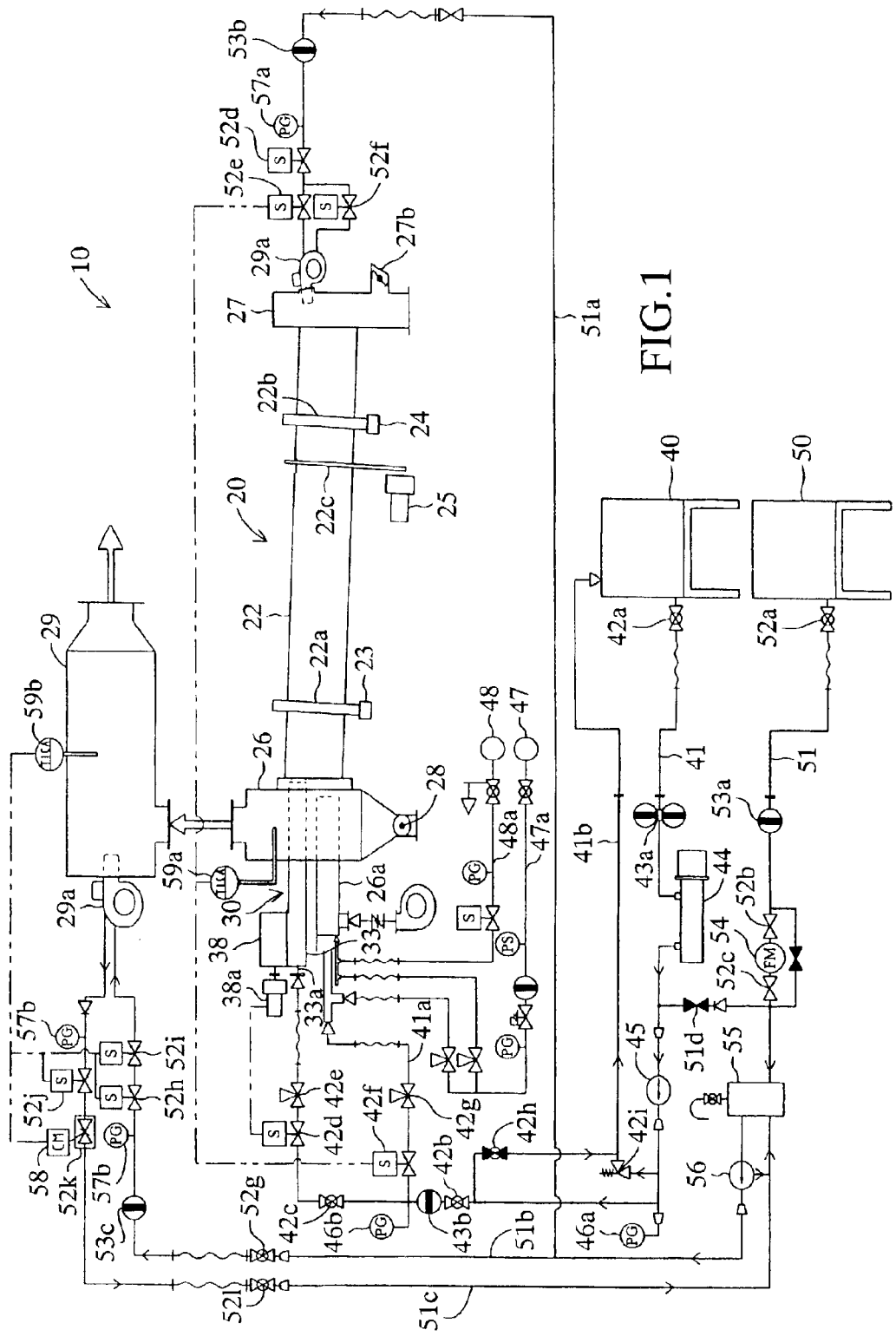
FIG. 1 is a block diagram showing the configuration of an empty-can treatment system according to an embodiment of the present invention.

An embodiment of an empty-can treatment system according to the present invention will next be described in detail with reference to the drawings. FIG. 1 shows an empty-can treatment system 10 according to the embodiment. The empty-can treatment system 10 includes a rotary kiln 20, which serves as the heating apparatus of the present invention; a screw-type conveying apparatus 30, which serves as the conveying apparatus of the present invention; a reclaimed oil tank 40, which partially constitutes the oil feed apparatus of the present invention; and a heavy oil tank 50.

Figure 2:
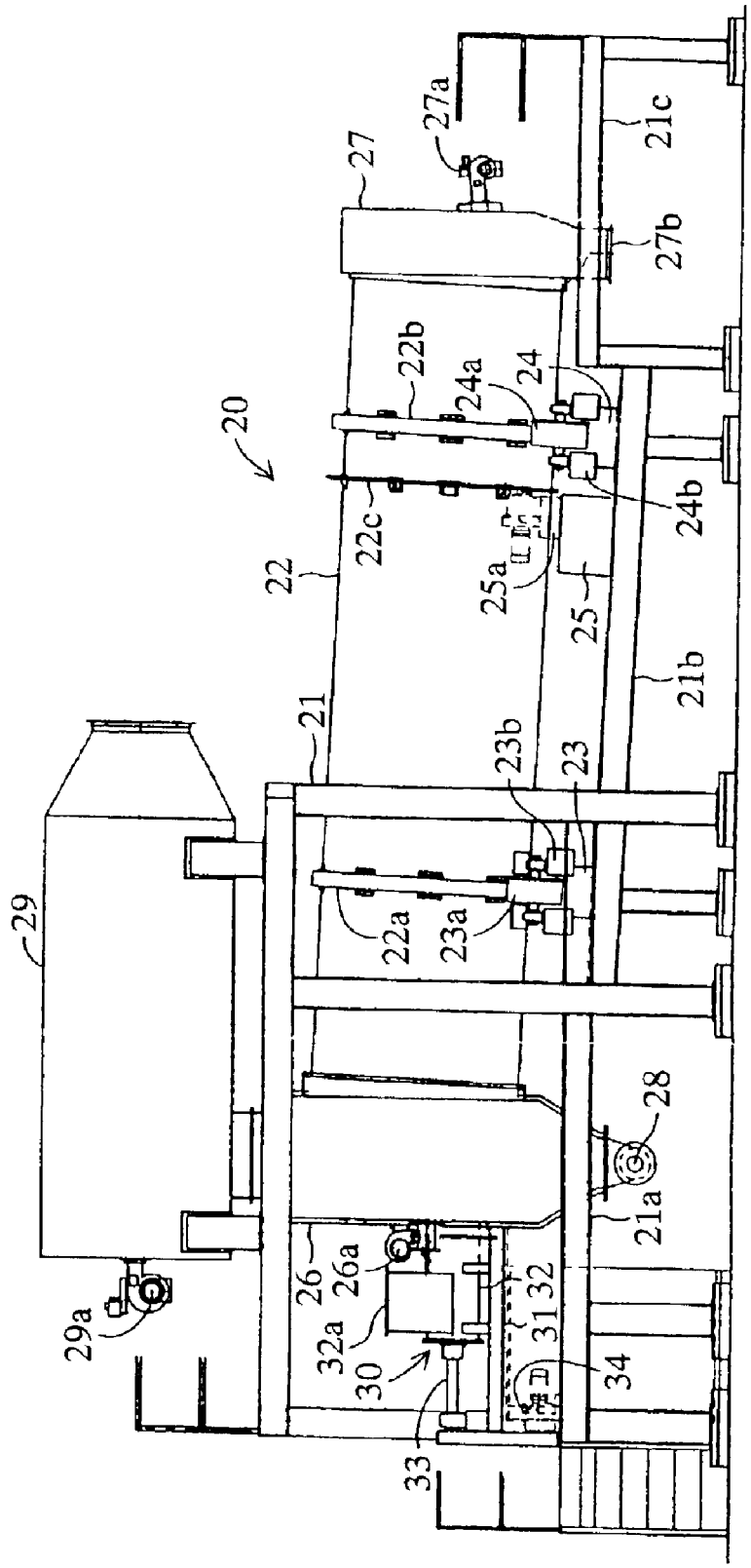
FIG. 2 is a front view of a rotary kiln provided in the empty-can treatment system of FIG. 1.
Figure 3:
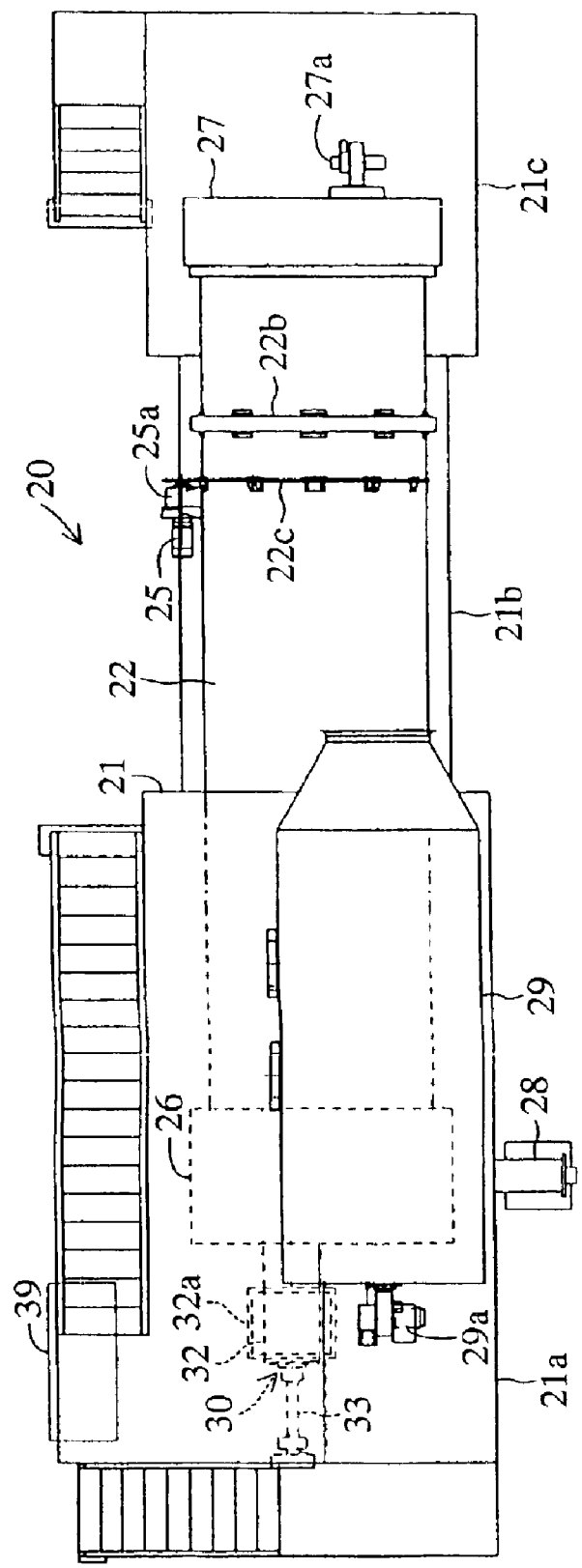
FIG. 3 is a plan view of the rotary kiln.
Figure 4:
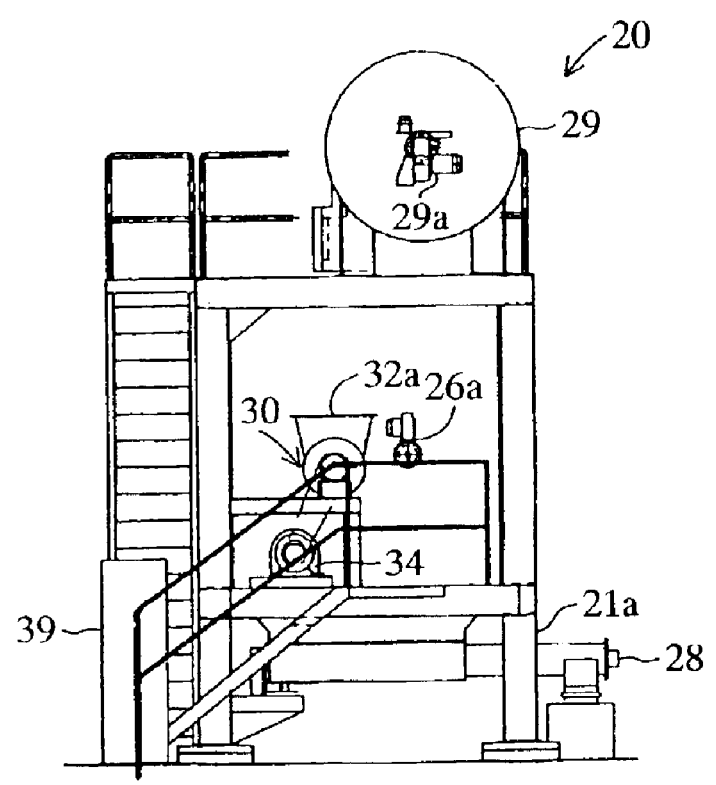
FIG. 4 is a side view of the rotary kiln.

As shown in FIGS. 2 to 4, the rotary kiln 20 includes a rotary, tubular member 22 disposed on a platform 21; a pair of guides 23 and 24 which support the rotary, tubular member 22 such that the rotary, tubular member 22 can rotate about its axis; a drive unit 25 for rotating the rotary, tubular member 22; a fore kiln 26; and an aft kiln 27. The platform 21 is composed of the following three portions: a two-level upstream platform 21a disposed at an upstream position (at a left-hand position in FIGS. 2 and 3); a center platform 21b disposed at the center; and a downstream platform 21c disposed at a downstream position (at a right-hand position in FIGS. 2 and 3).

The top surfaces of the upper and lower level portions of the upstream platform 21a and the top surface of the downstream platform 21c are horizontal, whereas the top surface of the center platform 21b is inclined downward toward the downstream side. The rotary, tubular member 22 has flange-like guide protrusions 22a and 22b formed on its outer circumferential surface at upstream and downstream portions, respectively, thereof. The rotary, tubular member 22 also has a flange-like engagement protrusion 22c formed on the outer circumferential surface between the guide protrusions 22a and 22b and in the vicinity of the guide protrusion 22b. The engagement protrusion 22c is engaged with a drive section 25a of the drive unit 25.

The paired guides 23 and 24 are disposed on the top surface of the center platform 21b at upstream and downstream positions, respectively, and support the rotary, tubular member 22 such that the downstream end of the rotary, tubular member 22 is situated lower than the upstream end of the same. The guide 23 (24) has a plurality of rollers 23a (24a) arranged at predetermined intervals along the circumferential surface of the guide protrusion 22a (22b), and a support 23b (24b) that supports the rollers 23a (24a) rotatably.

The drive unit 25 is disposed on the top surface of the central platform 21b in the vicinity of the engagement protrusion 22c, while the drive section 25a is engaged with the engagement protrusion 22c. Thus, when the drive unit 25 is activated, the rotary, tubular member 22 rotates about its axis while the circumferential surface of the guide protrusion 22a (22b) is in contact with the circumferential surfaces of the rollers 23a (24a) of the guide 23 (24) and while being guided by means of the guides 23 and 24.

The fore kiln 26 is disposed on the lower level portion of the upstream platform 21a in such a manner as to close the upstream opening of the rotary, tubular member 22. A burner 26a is provided on the upstream end panel of the fore kiln 26 at a substantially central position while being directed toward the center axis of the rotary, tubular member 22. Flames of this burner 26a heat empty cans (not shown) which are conveyed into the rotary, tubular member 22. A bottom portion of the fore kiln 26 is connected to a dust conveyor 28, whereas a top portion of the fore kiln 26 is connected to an afterburning kiln 29 disposed on the upper level portion of the upstream platform 21a.

The dust conveyor 28 conveys to the exterior of the system carbonized substances and dust which are generated within the fore kiln 26 and the rotary, tubular member 22 as a result of firing. The afterburning kiln 29 heats to 850° C. an exhaust gas having a temperature of about 400° C. which is generated within the fore kiln 26 and the rotary, tubular member 22, and sends the heated exhaust gas to an exhaust gas filter (not shown). The exhaust gas filter filters the exhaust gas before release to the exterior of the system.

The aft kiln 27 is disposed on the downstream platform 21c in such a manner as to close the downstream opening of the rotary, tubular member 22. A burner 27a is provided on the downstream end panel of the aft kiln 27 at a central position while being directed toward the center axis of the rotary, tubular member 22. Flames of this burner 27a heat empty cans which are conveyed within the rotary, tubular member 22.

Figure 5:
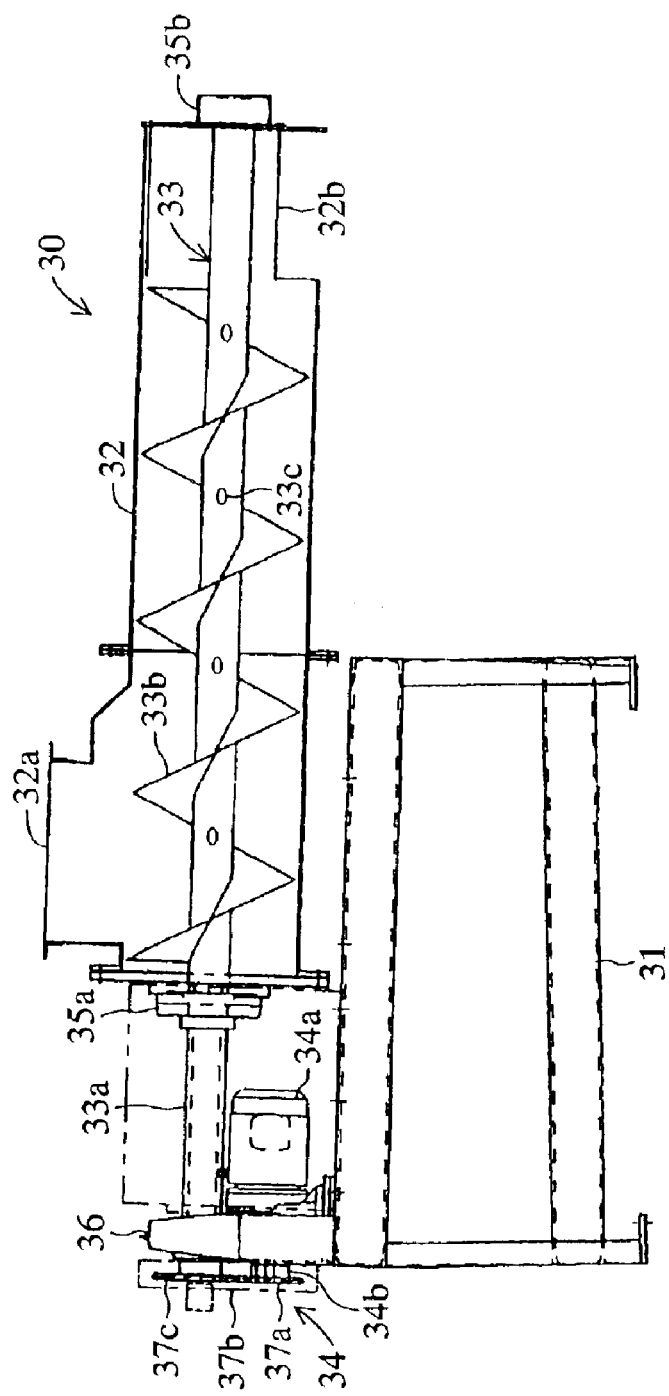
FIG. 5 is a front view of a screw-type conveying apparatus provided in the empty-can treatment system of FIG. 1.
Figure 6:
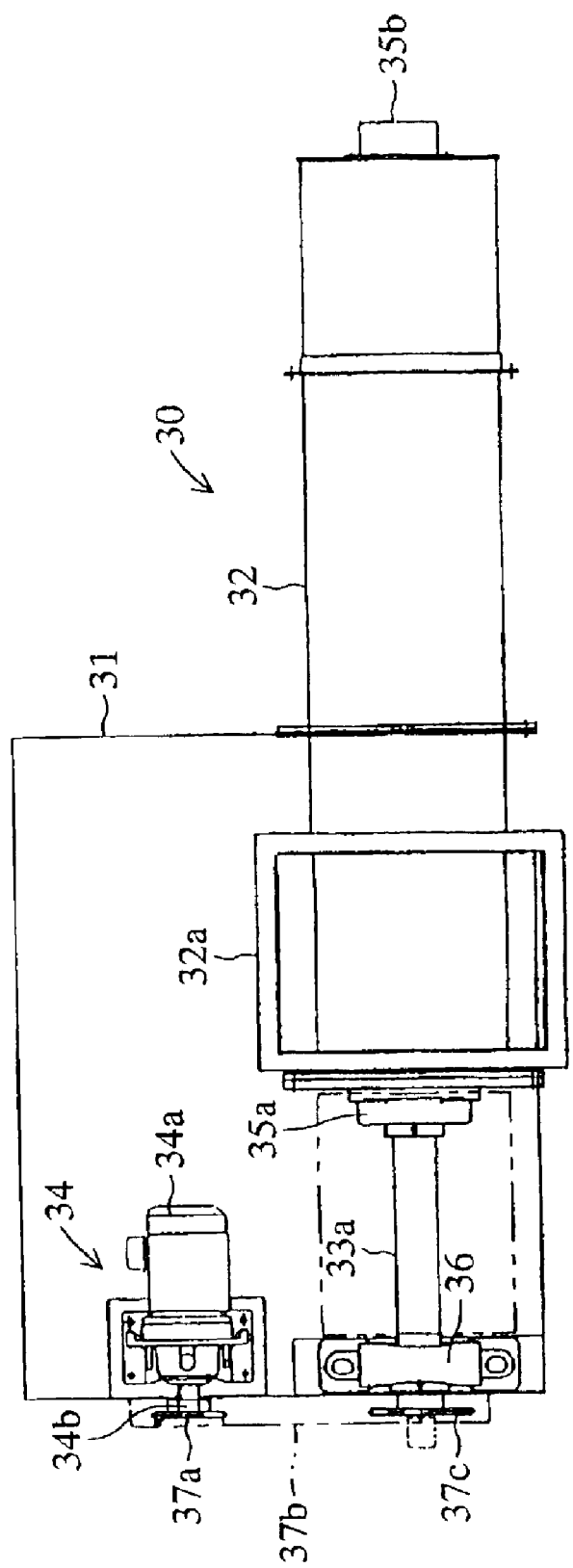
FIG. 6 is a plan view of the screw-type conveying apparatus.
Figure 7:
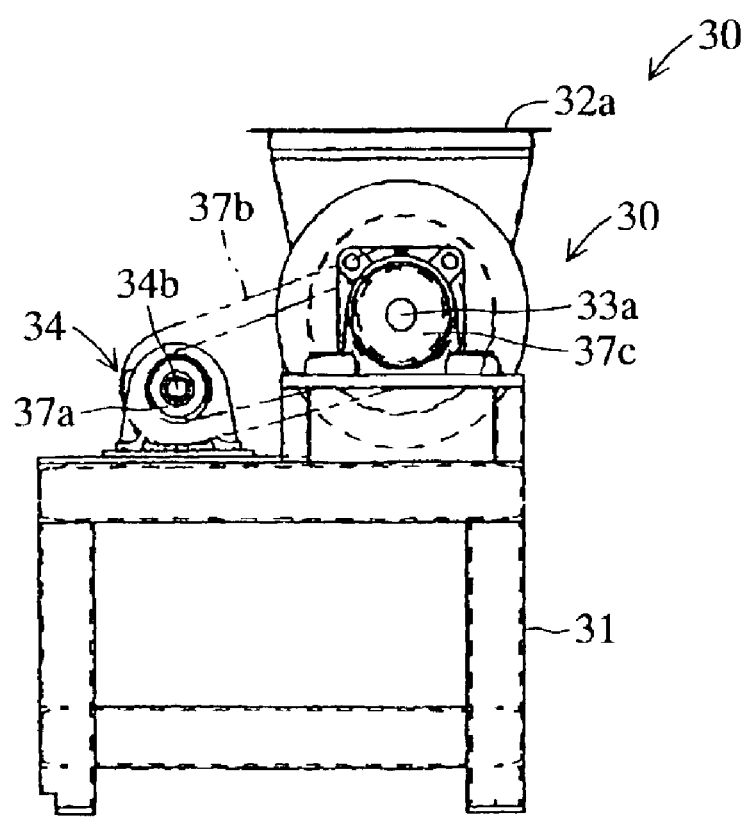
FIG. 7 is a side view of the screw-type conveying apparatus.

The screw-type conveying apparatus 30 is connected to the fore kiln 26 from the upstream side. The screw-type conveying apparatus 30 is mounted on a platform 31 installed on the lower level portion of the upstream platform 21a and is configured as shown in FIGS. 5 to 7. Specifically, the screw-type conveying apparatus 30 includes a casing pipe 32, which serves as the tubular member of the present invention; a conveying screw 33, which serves as the shaft member of the present invention and is rotatably mounted within the casing pipe 32; and a rotational drive unit 34 for rotating the conveying screw 33.

As shown in FIG. 5, the top surface of the platform 31 is inclined such that the upstream end is higher than the downstream end. The casing pipe 32 is mounted while being inclined along the inclined surface. The casing pipe 32 is closed at its opposite ends and has a charging shoot 32a formed at a top part of an upstream end portion thereof. The charging shoot 32a is adapted to receive empty cans which are conveyed by means of a conveyor 38 (see FIG. 1), and to drop the received empty cans into the casing pipe 32; thus, a top opening portion thereof is formed wide. A discharge port 32b is formed at a bottom part of a downstream end portion of the casing pipe 32 in order to drop empty cans which have passed through the casing pipe 32. A downstream portion of the casing pipe 32 extend through the fore kiln 26, and a downstream end portion where the discharge port 32b is formed reaches the interior of the rotary, tubular member 22.

The conveying screw 33 is mounted with in the casing pipe 32 coaxially with the casing pipe 32 and includes a pipe-like shaft portion 33a and a screw portion 33b formed spirally on the shaft portion 33a. A plurality of oil discharge holes 33c are formed on the shaft portion 33a at predetermined intervals in such a manner as to establish communication between the interior and exterior of the shaft portion 33a. The shaft portion 33a of the conveying screw 33 is supported for rotation about its axis, by means of rotation support members 35a and 35b which include respective bearings and are attached to the corresponding opposite end panels of the casing pipe 32, and a rotation support member 36 mounted on the top surface of the platform 31 at an upstream end position.

The rotational drive unit 34 includes a motor 34a and a rotative shaft 34b. A toothed pulley 37a mounted on the rotative shaft 34b is connected to a toothed pulley 37c mounted on an end part of the shaft portion 33a via a chain belt 37b. Thus, a torque that the running motor 34a creates is transmitted to the shaft portion 33a via the pulley 37a, the chain belt 37b, and the pulley 37c, thereby rotating the conveying screw 33. As shown in FIGS. 3 and 4, a control console 39 is disposed in the vicinity of the upstream platform 21a. The control console 39 includes a control unit for controlling the empty-can treatment system 10 and an operation panel for operating the empty-can treatment system 10.

The reclaimed oil tank 40 contains reclaimed oil, which is produced through reclamation of waste oil and serves as the oil used in the present invention. As shown in FIG. 1, the reclaimed oil tank 40 is connected to the shaft portion 33a of the conveying screw 33 via a pipe line 41. In the pipe line 41 are installed ball valves 42a, 42b, and 42c, strainers 43a, 43b, an oil preheater 44, a pump 45, pressure gauges 46a and 46b, a solenoid valve 42d, and an operation valve 42e. The solenoid valve 42d is electrically connected to a drive unit 38a of the conveyor 38. Operation from the control console 39 causes the solenoid valve 42d to operate in an interlocking relation with the operation of the conveyor 38.

When an operator opens the operation valve 42e and operates on the control console 39 so as to start the pump 45 and to open the solenoid valve 42d, reclaimed oil is fed to the screw-type conveying apparatus 30 from the reclaimed oil tank 40 via the pipe line 41. In the process of feeding reclaimed oil, the strainers 43a and 43b filter out impurities from the reclaimed oil; the oil preheater 44 preheats the reclaimed oil; and the ball valves 42a and 42b prevent backflow of the reclaimed oil. The pressure gauges 46a and 46b indicate the pressure of the interior of the pipe line 41.

The reclaimed tank 40 is also connected to the burner 26a via a pipe line 41a that branches off from the pipe line 41. A solenoid valve 42f and an operation valve 42g are installed in the pipe line 41a. When the operation valve 42g is opened, a portion of reclaimed oil fed from the reclaimed oil tank 40 is fed to the burner 26a. Further, a pipe line 41b for refluxing reclaimed oil to the reclaimed oil tank 40 branches off from the pipe line 41 at a position located upstream of where the pipe line 41a branches off from the pipe line 41, and is connected to the reclaimed oil tank 40. A ball valve 42h is installed in the pipeline 41b. The ball valve 42h opens only when the empty-can treatment system 10 is inactive, so as to collect to the reclaimed oil tank 40 reclaimed oil remaining in the pipe lines 41 and 41a, which are connected to the screw-type conveying apparatus 30 and the burner 26a.

The pipe line 41 and the pipe line 41b are connected via a safety valve 42i. When pressure in the pipe line 41 exceeds a predetermined value, the safety valve 42i opens so as to release reclaimed oil to the reclaimed oil tank 40 via the safety valve 42i and the pipe line 41b. A compressed air feed unit 47 is connected to the burner 26a via a pipe line 47a in order to feed compressed air to the burner 26a. A fuel gas feed unit 48 is connected to the burner 26a via a pipe line 48a in order to feed fuel gas to the burner 26a. Various valves and devices are installed in the pipe lines 47a and 48a, but detailed description thereof is omitted. Notably, the oil feed apparatus of the present invention is composed of the reclaimed oil tank 40, the pipe line 41, the oil discharge holes 33c formed on the shaft portion 33a, and valves and devices installed in the pipe line 41.

The heavy oil tank 50 contains heavy oil used to heat empty cans and to burn exhaust gas, and is connected to the burner 27a of the aft kiln 27 via pipe lines 51 and 51a. In the pipe line 51 are installed a ball valve 52a, strainers 53a and 53b, gate valves 52b and 52c, a flowmeter 54, a storage cylinder 55, a pump 56, a pressure gauge 57a, and solenoid valves 52d, 52e, and 52f. The solenoid valve 52e is electrically connected to the solenoid valve 42f and operates in an interlocking relation with the solenoid valve 42f. The storage cylinder 55 temporarily stores heavy oil which is sent thereto from the heavy oil tank 50 via the strainer 53a when the pump 56 is operated.

When an operator operates on the control console 39 so as to start the pump 56 and to open the solenoid valves 52d and 52e, heavy oil is fed to the burner 27a of the aft kiln 27 from the storage cylinder 55 via the pipe line 51a. In this case, the strainer 53b filters out impurities from heavy oil. The storage cylinder 55 is also connected to a burner 29a of the afterburning kiln 29 via a pipe line 51b which branches off from the pipe line 51a. In the pipe line 51b are installed a ball valve 52g, a strainer 53c, a pressure gauge 57b, and solenoid valves 52h and 52i. When the solenoid valves 52h and 52l are opened, a portion of heavy oil fed from the heavy oil tank 50 via the storage cylinder 55 is also fed to the burner 29a.

Further, the burner 29a and the storage cylinder 55 are connected by means of a pipe line 51c, so that heavy oil fed to the burner 29a can be collected to the storage cylinder 55 via the pipeline 51c. In the pipeline 51c are installed a pressure gauge 57b, a solenoid valve 52j, a valve 52k which is controlled by means of a control motor 58, and a ball valve 52l. Temperature alarm devices 59a and 59b are installed on the fore kiln 26 and the afterburning kiln 29, respectively, so as to give the alarm when an abnormal temperature is detected.

The temperature alarm device 59a is electrically connected to the solenoid valves 42f and 52e so as to perform the following operation. Upon occurrence of temperature abnormality in the fore kiln 26, the solenoid valves 42f and 52e are closed to thereby shut off feed of reclaimed oil to the burner 26a and feed of heavy oil to the burner 27a. The temperature alarm device 59b is electrically connected to the control motor 58 and the solenoid valve 52i so as to perform the following operation. Upon occurrence of temperature abnormality in the afterburning kiln 29, the solenoid valve 52l is closed to thereby shut off feed of heavy oil to the burner 29a; and the valve 52k is opened under control of the control motor 58 to thereby collect to the storage cylinder 55 heavy oil which is fed to the burner 29a via the pipe line 51b. The pipe lines 51 and 41 are connected by means of a pipe line 51d, so that heavy oil can also be fed to the pipe line 41 from the heavy oil tank 50.

The thus-configured empty-can treatment system 10 recycles used empty cans in the following manner. First, an operator operates on the control console 39 so as to activate the apparatuses provided in the empty-can treatment system 10. As a result, the burners 26a and 27a are turned on so as to raise atmospheric temperature within the rotary, tubular member 22 to about 400° C.; and the drive unit 38a is started so as to run the conveyance belt of the conveyor 38. Then, empty cans are placed on the upstream end of the conveyor 38. The empty cans are conveyed on the conveyor 38 to the downstream end of the conveyor 38 and drop into the casing pipe 32 through the charging shoot 32a.

The empty cans are conveyed toward the rotary, tubular member 22 while being rolled, by means of the screw portion 33b of the conveying screw 33, which is rotated by means of the motor 34a. At this time, the solenoid valve 42d opens in an interlocking relation with the drive unit 38a: thus, reclaimed oil fed from the reclaimed oil tank 40 is introduced into the shaft portion 33a and discharged from the oil discharge holes 33c. Thus, while the empty cans are passing through the casing pipe 32, reclaimed oil adheres to the surfaces of the empty cans.

The empty cans with reclaimed oil adhering to the surfaces thereof drop from the discharge port 32b and enter the rotary, tubular member 22 which is being rotated by means of the drive unit 25. The empty cans in the rotary, tubular member 22 are conveyed from the upstream end of the rotary, tubular member 22 to the downstream end of the same while being heated by means of flames of the burner 26a of the fore kiln 26 and flames of the burner 27a of the aft kiln 27. The burners 26a and 27a are directed toward a central portion of the rotary, tubular member 22 or a portion slightly above the central portion so as to avoid the flames of the burners 26a and 27a directly impinging on the empty cans.

Thus, a coating layer can be removed, through carbonization, from the surface of each empty can without involvement of excessive oxidation of an aluminum material used to form the lid wall of the empty can. Heating temperature may be such that reclaimed oil adhering to the surface of an empty can catches fire. The coating layer can be sufficiently heated by means of the heat of burning reclaimed oil. When temperature within the rotary, tubular member 22 reaches an appropriate temperature of 400° C. preferably, the burners 26a and 27a are turned off, and the empty cans are conveyed through the rotary, tubular member 22 while the burners 26a and 27a remain off. When temperature within the rotary, tubular member 22 drops to, for example, 350° C. or lower, the burners 26a and 27a may be turned on, whereby an appropriate heating temperature for the empty cans can be maintained.

In the process of passing through the rotary, tubular member 22, empty cans are not only heated but also subjected to vibration; as a result, a steel material and an aluminum material used to form each of the empty cans separate from each other or are brought into an about-to-mutually-separate condition. Generally, an empty can is in such a state that an opening edge portion of a closed-bottomed cylindrical steel material used to form a bottom wall and a peripheral side wall is partially crimped with a circumferential edge portion of a circular aluminum material used to form the lid wall.

Heating such an empty can causes an engaged portion of the steel material and the aluminum material to deform toward disengagement because of difference in thermal expansion coefficient therebetween. Also, in the process of passing through the rotary, tubular member 22, empty cans are stirred and vibrated by means of rotation of the rotary, tubular member 22. Stirring allows the entire surface of each empty can to be heated in a substantially uniform condition, whereby a coating layer can be appropriately carbonized. Vibration accelerates the tendency toward mutual separation of the steel material and the aluminum material. As a result, before empty cans reach the downstream end of the rotary, tubular member 22, the steel material and aluminum material of each of the empty cans are separated from each other or brought into an about-to-mutually-separate condition.

Empty cans which have reached the downstream end of the rotary, tubular member 22 drop through a discharge port 27b provided at the bottom portion of the aft kiln 27. After dropping through the discharge port 27b, the empty cans are conveyed to a granulator (not shown) by means of a conveyor. In the granulator, the empty cans undergo complete separation of the steel material and the aluminum material, and the steel material and the aluminum material are formed into steel pellets and aluminum pellets. Carbonized substances and dust generated within the rotary, tubular member 22 are conveyed to the exterior of the system by means of the dust conveyor 28 and treated appropriately. Exhaust gas is sent to the afterburning kiln 29 and burned completely at high temperature through application of heat. The exhaust gas which has undergone afterburning is filtered and released to the exterior of the system.

As described above, according to the empty-can treatment system 10, reclaimed oil is caused to adhere to the surfaces of empty cans, and the empty cans are heated so as to burn the reclaimed oil, whereby the heat of burning oil is used to burn a coating layer on the surface of each empty can. Thus, the coating layer can be readily removed through carbonization without need to set the interior of the rotary, tubular member 22 to high temperature. Therefore, the interior of the rotary, tubular member 22 can be set to a low temperature of about 350° C. to 450° C., whereby oxidation of an aluminum material can be minimized. Thus, the recovery rate for the aluminum material is enhanced greatly. Further, employment of this range of heating temperature suppresses oxidation of a steel material, thereby enhancing the recovery rate for the steel material.

Since the oil feed apparatus for feeding reclaimed oil to the screw-type conveying apparatus 30 includes a pipe-like shaft portion 33a and the oil discharge holes 33c, the distance between the oil discharge holes 33c and the empty cans in process of conveyance by means of the conveying screw 33 becomes short, whereby reclaimed oil can be effectively applied to the surfaces of the empty cans. Thus, coating layers can be effectively removed through carbonization.

The present invention is not limited to the above-described embodiment, but may be modified as appropriate. For example, the heating apparatus is hot limited to the rotary kiln 20, but may be configured such that a tubular member is vibrated in vertical and horizontal directions or such that empty cans are heated while being conveyed on a roller conveyor. The oil discharge holes 33c for discharging reclaimed oil toward empty cans are not necessarily formed on the shaft portion 33a, but may be formed on the casing pipe 32. Further, the conveying apparatus is not limited to the screw-type conveying apparatus 30, but may be a roller conveyor or the like.

In the above embodiment, reclaimed oil is applied to empty cans. However, heavy oil, waste oil, or other oil may be used. Preferably, oil having viscosity which is appropriately high is used. For example, oil, such as kerosene, which is fluid and flows away soon from empty cans even when it is caused to adhere to the empty cans must be avoided. Oil which can remain adhering to the surfaces of empty cans in the process of heating is preferred.

What is claimed is:

1. An empty-can treatment system comprising:
   a heating apparatus for heating empty cans each formed from a steel material and an aluminum material and having a coated surface, so as to carbonize a coating layer on the coated surface of each of said empty cans and to facilitate mutual separation of said steel material and said aluminum material through utilization of difference in thermal expansion coefficient between said materials;
   a conveying apparatus for conveying said empty cans to said heating apparatus; and
   an oil feed apparatus for applying oil to surfaces of said empty cans being conveyed by means of said conveying apparatus.

2. An empty-can treatment system according to claim 1, wherein said heating apparatus is a rotary kiln.

3. An empty-can treatment system according to claim 2, wherein said rotary kiln is disposed in such a manner as to be inclined downward toward a downstream side.

4. An empty-can treatment system according to claim 1, wherein said heating apparatus uses a burner for heating said empty cans, and said burner is arranged such that a flame from said burner does not directly impinge on said empty cans.

5. An empty-can treatment system according to claim 1, wherein said heating apparatus is connected to an afterburning kiln adapted to completely burn exhaust gas generated in said heating apparatus, before release of the exhaust gas to an exterior of said system.

6. An empty-can treatment system according to claim 1, wherein said heating apparatus is connected to a dust conveyor adapted to convey a carbonized substance and dust generated in said heating apparatus to an exterior of said system.

7. An empty-can treatment system according to claim 1, wherein said conveying apparatus comprises a tubular member allowing said empty cans to pass therethrough; and a shaft member disposed within said tubular member and having a spiral screw portion formed on a circumferential surface of said shaft member.

8. An empty-can treatment system according to claim 7, wherein said conveying apparatus is disposed in such a manner as to be inclined downward toward a downstream side.

9. An empty-can treatment system according to claim 7, wherein said shaft member is a pipe having oil discharge holes formed thereon at predetermined intervals; and said shaft member is connected to said oil feed apparatus such that oil fed from said oil feed apparatus is discharged into an interior of said tubular member through said oil discharge holes.

10. An empty-can treatment system according to claim 9, wherein oil is fed under pressure to said oil discharge holes of said shaft member from said oil feed apparatus via a pipe line and a pump.

11. An empty-can treatment system according to claim 1, wherein oil fed from said oil feed apparatus is reclaimed oil, and said oil feed apparatus comprises a reclaimed oil tank for storing the reclaimed oil.

* * * * *